(12) United States Patent
Reifschneider et al.

(10) Patent No.: US 7,150,477 B2
(45) Date of Patent: Dec. 19, 2006

(54) ROTARY JOINTS

(75) Inventors: Mark A. Reifschneider, Canaan, ME (US); Richard A. Lippert, Oakland, ME (US)

(73) Assignee: S.D. Warren Company, Westbrook, ME (US)

( * ) Notice: Subject to any disclaimer, the term of this patent is extended or adjusted under 35 U.S.C. 154(b) by 31 days.

(21) Appl. No.: 10/125,982

(22) Filed: Apr. 19, 2002

(65) Prior Publication Data

US 2003/0197368 A1    Oct. 23, 2003

(51) Int. Cl.
    *F16L 27/00* (2006.01)
(52) U.S. Cl. .................. 285/281; 285/13; 285/273; 277/417; 277/422; 277/579; 277/518; 277/303; 277/305
(58) Field of Classification Search .......... 285/121.6, 285/123.6, 123.12, 281, 273; 277/412, 417, 277/422, 518, 303, 305
    See application file for complete search history.

(56) References Cited

U.S. PATENT DOCUMENTS

| | | | | | |
|---|---|---|---|---|---|
| 2,528,436 | A | * | 10/1950 | Johnson | 277/518 |
| 2,891,808 | A | * | 6/1959 | Richardson | 277/412 |
| 3,377,073 | A | * | 4/1968 | Harney | 277/422 |
| 3,411,526 | A | | 11/1968 | Schaefer | 137/312 |
| 4,233,011 | A | | 11/1980 | Bolender et al. | 425/143 |
| 4,254,972 | A | | 3/1981 | Wiedenbeck et al. | 285/61 |
| 4,300,842 | A | | 11/1981 | Hold et al. | 366/99 |
| 4,341,093 | A | * | 7/1982 | Oishi et al. | 277/412 |
| 4,358,937 | A | * | 11/1982 | Okamoto et al. | 277/412 |
| 4,363,490 | A | * | 12/1982 | Kuehn | 277/419 |
| 4,364,241 | A | * | 12/1982 | Okamoto et al. | 277/412 |
| 4,368,895 | A | | 1/1983 | Okamoto et al. | 277/203 |
| 4,683,628 | A | | 8/1987 | Schönemann | 29/116 |
| 4,749,199 | A | * | 6/1988 | Gresh | 277/412 |
| 4,817,410 | A | | 4/1989 | Yatsuzuka et al. | 72/199 |
| 4,955,433 | A | | 9/1990 | Zaoralek | 165/89 |
| 5,015,000 | A | * | 5/1991 | Perini | 277/422 |
| 5,037,115 | A | | 8/1991 | Brandon | 277/26 |
| 5,046,718 | A | * | 9/1991 | Hay, II | 277/303 |
| 5,087,082 | A | * | 2/1992 | Anthonsen | 285/281 |
| 5,348,352 | A | * | 9/1994 | Ciez et al. | 285/121.6 |
| 5,598,600 | A | | 2/1997 | Stegens | 15/179 |
| 5,702,130 | A | * | 12/1997 | Jostein | 285/121.6 |
| 6,146,020 | A | | 11/2000 | Innis, Jr. | 384/486 |
| 6,287,014 | B1 | | 9/2001 | Salla | 384/546 |
| 6,315,703 | B1 | | 11/2001 | Quack et al. | 492/46 |

FOREIGN PATENT DOCUMENTS

| | | |
|---|---|---|
| DE | 853557 | 7/1949 |
| GB | 278305 | * 2/1928 |

* cited by examiner

*Primary Examiner*—David Bochna
(74) *Attorney, Agent, or Firm*—Fish & Richardson P.C.

(57) ABSTRACT

Rotary joints are provided, to allow fluid to flow from a stationary member to a rotating member. The rotary joints include a housing, configured to fit over the rotating member, a rotatable coupling disposed within the housing, configured to be fixedly attached to the rotating member, and a floating seal system that allows relative movement between the parts being sealed, accommodating thermal expansion and contraction of the parts.

23 Claims, 12 Drawing Sheets

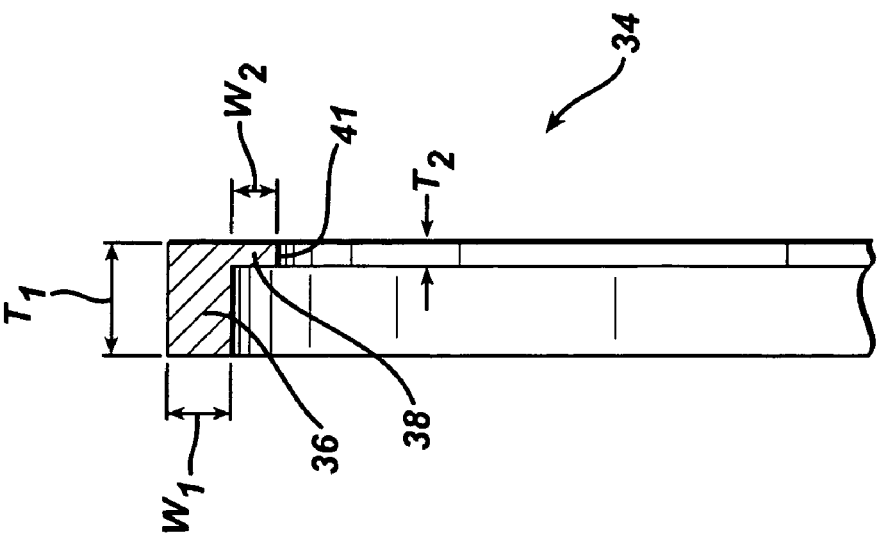
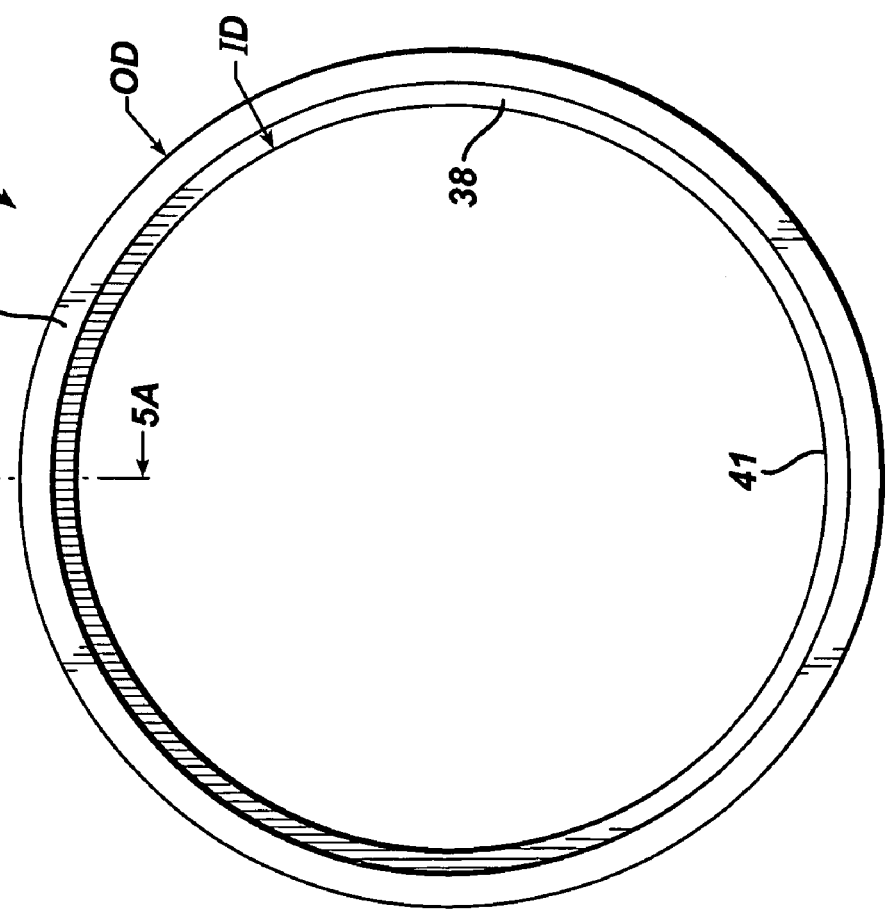

ROTARY JOINTS

TECHNICAL FIELD

This invention relates to rotary joints, and more particularly to rotary joints used with calendar rolls.

BACKGROUND

In the papermaking field, rotary joints are often used to deliver hot fluid, e.g., hot oil, to a rotating calendar roll to heat the surface of the roll. Bearings, requiring a dedicated lubrication system, are generally used to support and separate the rotating and stationary components of the joint. Mechanical seals are generally used to prevent leakage of the fluid as it passes from a supply, through the rotary joint and into the calendar roll. These bearings and seals are subject to failure, and in some cases failure of the rotary joint may result in fire due to the presence of the hot oil.

Similar joints are used in the textile industry, for example, on laminating rolls used in carpet manufacturing and press rolls in chipboard mills.

SUMMARY

The present invention features a rotary joint that provides good sealing between a rotating member, such as a calendar, press, or laminating roll, and a stationary member, such as a conduit for supplying fluid to the rotating member. Sealing is provided without the use of mechanical seals providing a safe, reliable seal. In preferred implementations, the rotary joint is also free of any bearings. Sealing is provided by floating ring seals that can be easily assembled and maintained. The floating rings allow relative movement between the parts that are being sealed, accommodating thermal expansion and contraction of the parts and the radial movement of the rotating member due to the bearing radial internal clearance. In some implementations, the seals are configured to allow a controlled amount of fluid to leak from a purged chamber of the rotary joint, and, if desired, this fluid is recycled back into the rotary joint via a fluid loop. Preferred rotary joints provide enhanced safety in the manufacturing environment, and can be used with hot, flammable fluids such as hot oil, with little or no danger of fire.

In one aspect, the invention features a rotary joint configured to couple a rotating member to a relatively stationary member, including (a) a housing, configured to fit over the rotating member and receive a fluid to be delivered from the stationary member to the rotating member, (b) a rotatable coupling disposed within the housing, configured to be fixedly attached to the rotating member, and (c) a floating seal system configured to allow a controlled amount of fluid to leak from the rotary joint during delivery of a fluid from the stationary member to the rotating member.

Some implementations may include one or more of the following features. The controlled amount is from about 0.5 to 2.0% of the total flow of fluid into the rotary joint. The controlled amount is from about 1 to 20 gallons/minute. The rotating member includes a calendar roll. The floating seal system includes a plurality of floating labyrinth seals. The floating labyrinth seals are disposed between the rotatable coupling and portions of the housing. The rotary joint further includes a nitrogen-purged chamber configured to capture the fluid leaking from the rotary joint and allow this fluid to be collected for return to the rotary joint. The rotary joint does not include bearings. The rotary joint does not include mechanical seals. The housing and rotatable coupling are formed of the same material, e.g., steel. The floating seal system is configured to allow air to self-vent through the rotary joint upon start-up after a maintenance outage. The floating seal system is configured to allow air to vent through the rotary joint at a rate of at least 25 gallons/minute, preferably at least 100 gallons/minute.

In another aspect, the invention features a rotary joint configured to couple a rotating member to a relatively stationary member, including (a) a housing, configured to fit over the rotating member, (b) an end plate, extending from a distal end of the housing and configured to allow the stationary member to be fixedly attached to the housing, (c) a rotatable coupling disposed within the housing, configured to be fixedly attached to the rotating member, and to receive a portion of the end plate in sealing engagement, (d) a first seal, configured to provide sealing engagement between the rotatable coupling and the portion of the end plate, and (e) a second seal, configured to provide sealing engagement between the rotatable coupling and an inner wall of the housing.

Some implementations may include one or more of the following features. The joint further includes a third seal, configured to provide sealing engagement between a rotatable roll journal and the inner wall of the housing. The first, second and third seals are floating seals, e.g., floating labyrinth seals. The rotary joint does not include bearings. The rotary joint does not include mechanical seals. The housing and rotatable coupling are formed of the same material, e.g., steel. The first seal is a high-pressure seal. The second seal is a low-pressure seal. The third seal is a purge gas-conserving seal. The rotatable coupling includes a second portion configured for insertion into a cavity in the rotating member. The stationary member is configured to deliver a fluid to the rotating member through the rotary joint. The second portion of the rotatable coupling sealingly engages the portion of the end plate, the sealing engagement being provided by the first seal. The second portion of the rotatable coupling and the portion of the end plate define a bore. The end plate defines an inlet, and the bore is configured to allow fluid flow from the inlet to a cavity in the rotating member. The end plate further defines an outlet, and an outer wall of the second portion of the rotatable coupling and an inner wall of a cavity in the housing define a passage through which fluid can flow from the rotating member to the outlet.

In yet a further aspect, the invention features a method of delivering fluid from a stationary source to a rotating member, including (a) delivering a fluid from the source to a rotary joint comprising a housing, configured to fit over the rotating member and having a portion configured to receive the fluid, (b) passing fluid through a rotatable coupling, disposed within the housing and configured to be fixedly attached to the rotating member, and (c) allowing a controlled amount of fluid to leak past a floating seal system disposed between the rotatable coupling and the housing.

Some implementations may include one or more of the following features. The controlled amount is from about 0.5 to 2.0% of the total flow of liquid into the rotary joint. The controlled amount is from about 1 to 20 gallons/minute. The floating seal system includes a plurality of floating labyrinth seals. The method further includes collecting the leaked fluid and returning it to the source for delivery into the rotary joint. The liquid is hot oil, e.g., mineral oil. The method further includes purging air-containing areas of the housing, e.g., purging them with an inert gas to inhibit oxidation of the oil. The liquid has a viscosity lower than that of water when the liquid is being circulated near its fluid maximum bulk operating temperature.

In another aspect, the invention features a floating seal for sealing between an inner cylindrical surface and an outer cylindrical surface, the inner and outer surfaces defining a chamber. The seal includes (a) a plurality of rings configured to fit in the chamber, positioned side-by-side along the length of the chamber, and to float within the chamber, and (b) a biasing member configured to apply an axial end pressure to the rings in the direction of fluid entering the chamber during use of the seal, keeping the rings compressed together and against an end face of the chamber to minimize leakage around the outside diameter of the rings.

Some implementations may include one or more of the following features. The chamber that contains the rings is at least 0.100 inch larger in diameter than the outer diameter of the rings, e.g., the chamber is from 0.100 to 1.00 inch larger in diameter than the outer diameter of the rings. The biasing member includes a wave spring. The floating seal is configured to minimize leakage of a liquid through the seal. The rings are configured to provide a tortuous path comprising alternating restricted areas and larger turbulence-creating void areas.

The invention also features, in another aspect, a floating seal for sealing between an inner cylindrical surface and an outer cylindrical surface, the inner and outer surfaces defining a chamber, the seal including a plurality of rings configured to define a tortuous path comprising alternating restricted areas and larger turbulence-creating void areas.

In another aspect, the invention features a rotary joint configured to couple a rotating member to a relatively stationary member, including (a) a housing, configured to fit over the rotating member and receive a fluid to be delivered from the stationary member to the rotating member, (b) a rotatable coupling disposed within the housing, configured to be fixedly attached to the rotating member, and (c) a floating seal system comprising a floating labyrinth seal including a plurality of rings configured to define a tortuous path comprising alternating restricted areas and larger turbulence-creating void areas.

The term "floating seal", as used herein, refers to a seal that, when sealingly disposed between two parts, allows clearance and relative axial and radial movement between the two parts.

The details of one or more embodiments of the invention are set forth in the accompanying drawings and the description below. Other features and advantages of the invention will be apparent from the description and drawings, and from the claims.

DESCRIPTION OF DRAWINGS

FIGS. 5 and 5A are, respectively, top and cross-sectional views of a ring suitable for use in a floating seal. FIG. 5A is taken along section line 5A—5A in FIG. 5.

DETAILED DESCRIPTION

Figure 1:
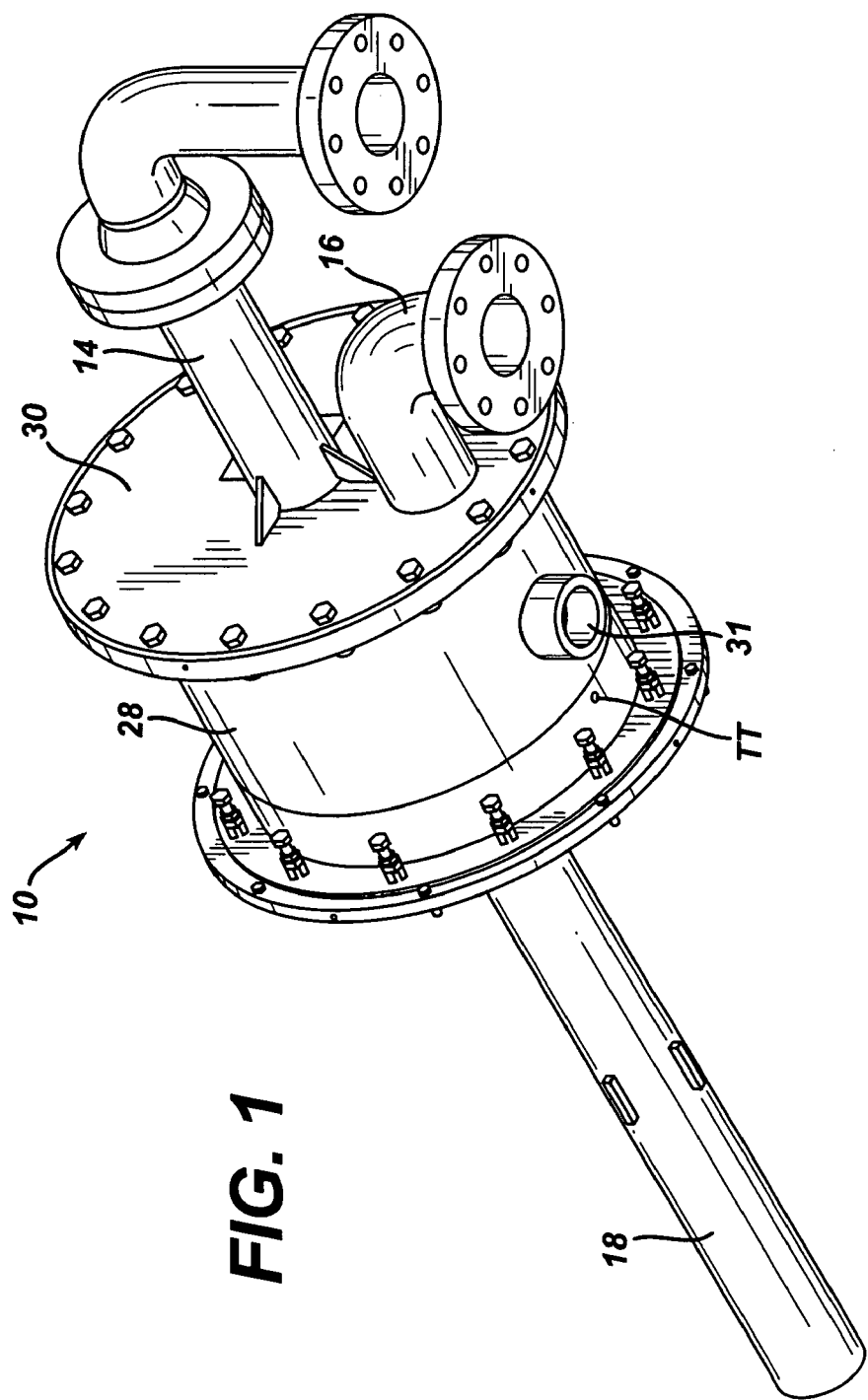
FIG. 1 is a perspective view of a rotary joint according to one aspect of the invention.
Figure 2:
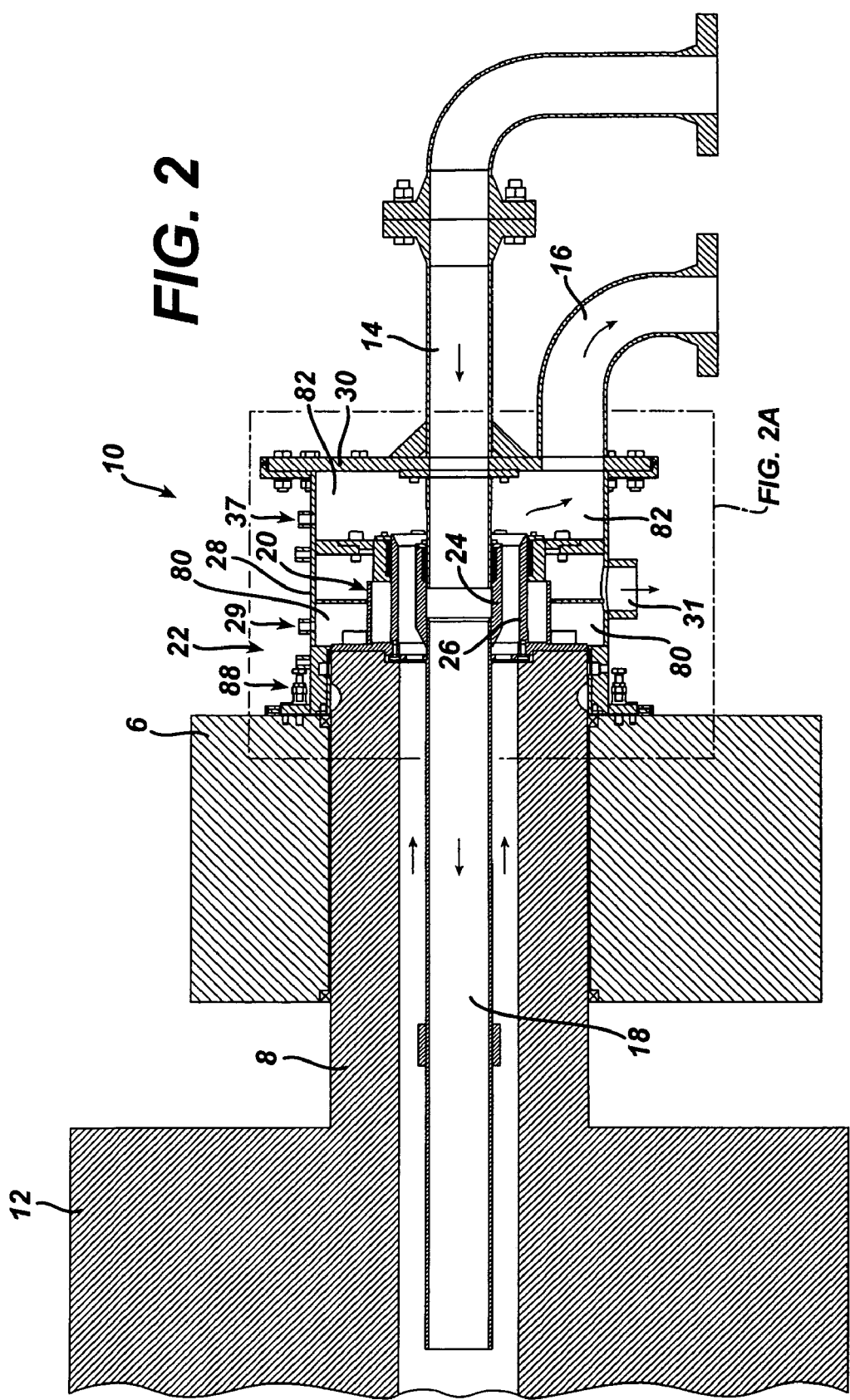
FIG. 2 is an axial cross-sectional view of the assembly shown in FIG. 1.

A rotary joint 10 is shown in FIG. 1. In FIG. 2, rotary joint 10 is mounted on a bearing housing 6, which supports the journal 8 of a calendar roll 12, for example a calendar roll suitable for use in papermaking. Rotary joint 10 includes an inlet conduit 14, through which a fluid, e.g., hot oil, can enter the rotary joint, and an outlet conduit 16, though which the fluid can exit the rotary joint. In use, these conduits are connected to a fluid supply, e.g., a source of hot oil (not shown). The fluid supply is configured to heat oil exiting the rotary joint and pump it back into the rotary joint. The direction of flow of fluid through the rotary joint is indicated by the arrows in FIG. 2. The hot fluid flows from the inlet conduit through an internal supply pipe 18 (FIG. 2) and thus into the calendar roll 12 to heat the surface of the calendar roll. The fluid makes several passes (not shown) under the surface of the calendar roll, as is well known in the papermaking field, and then exits the rotary joint via outlet conduit 16.

Figure 2A:
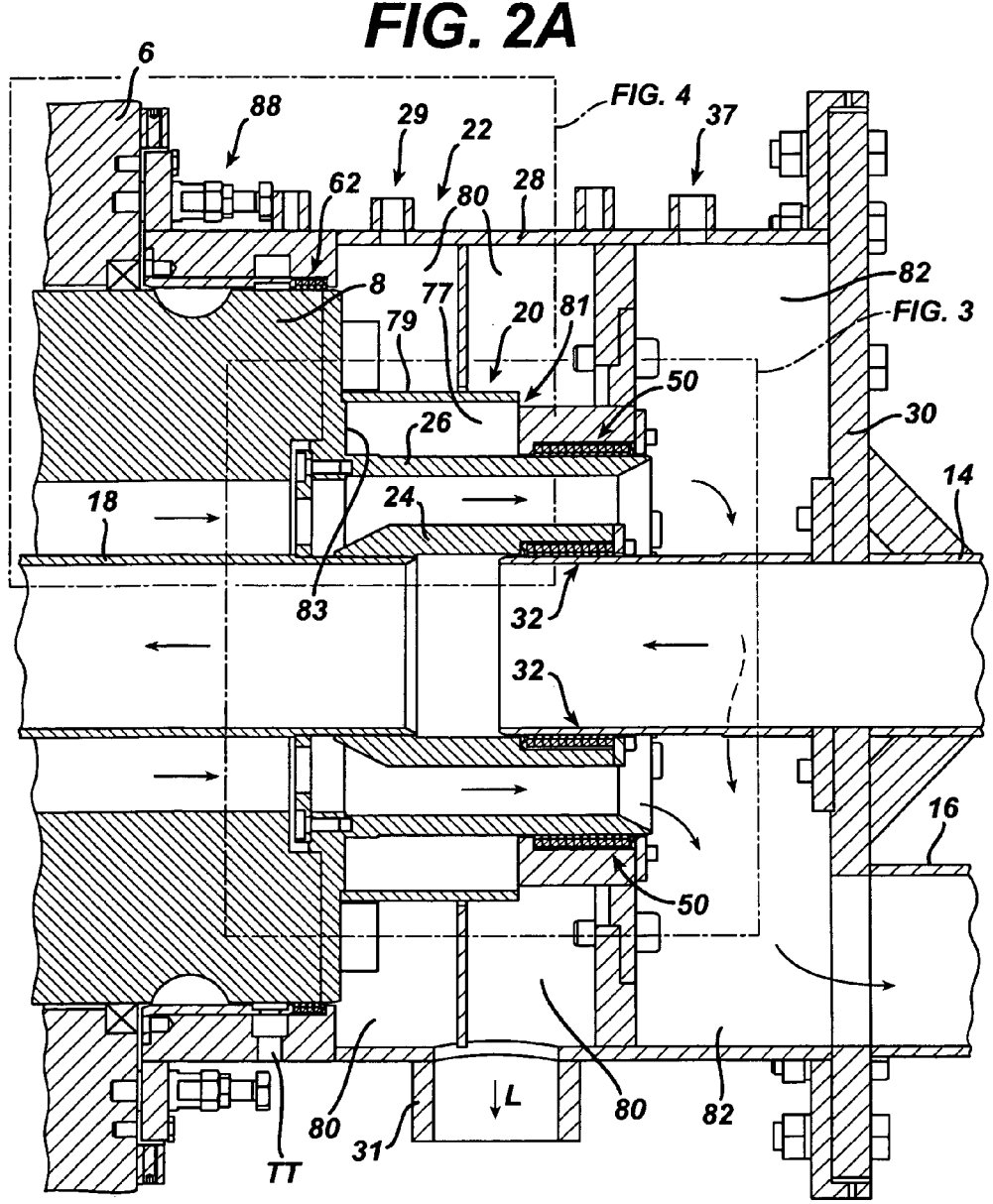
FIG. 2A is an enlarged view of the area indicated in dotted lines in FIG. 2.
Figure 2B:
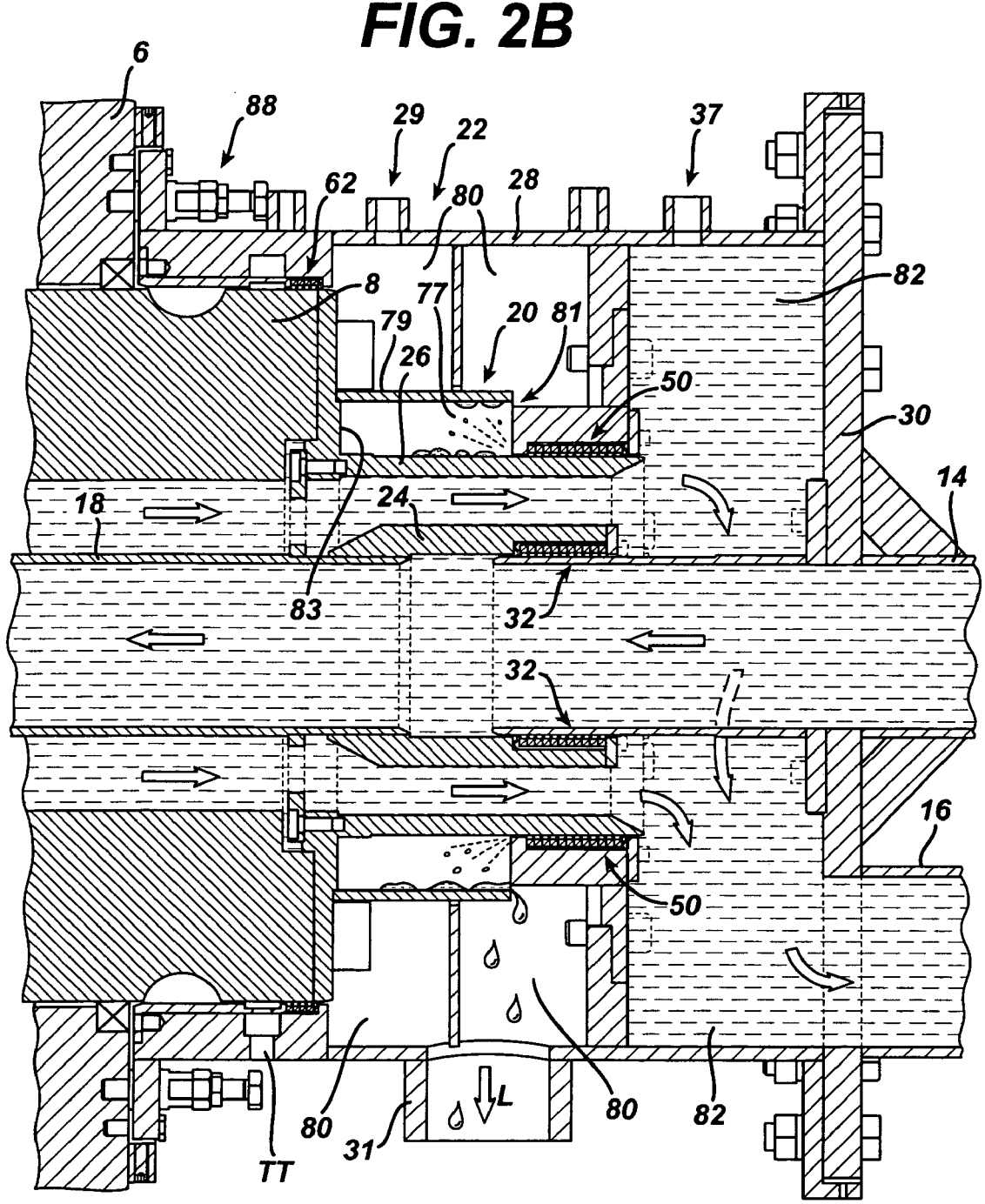
FIG. 2B is a view similar to FIG. 2A, with fluid indicated by shading.
Figure 2C:
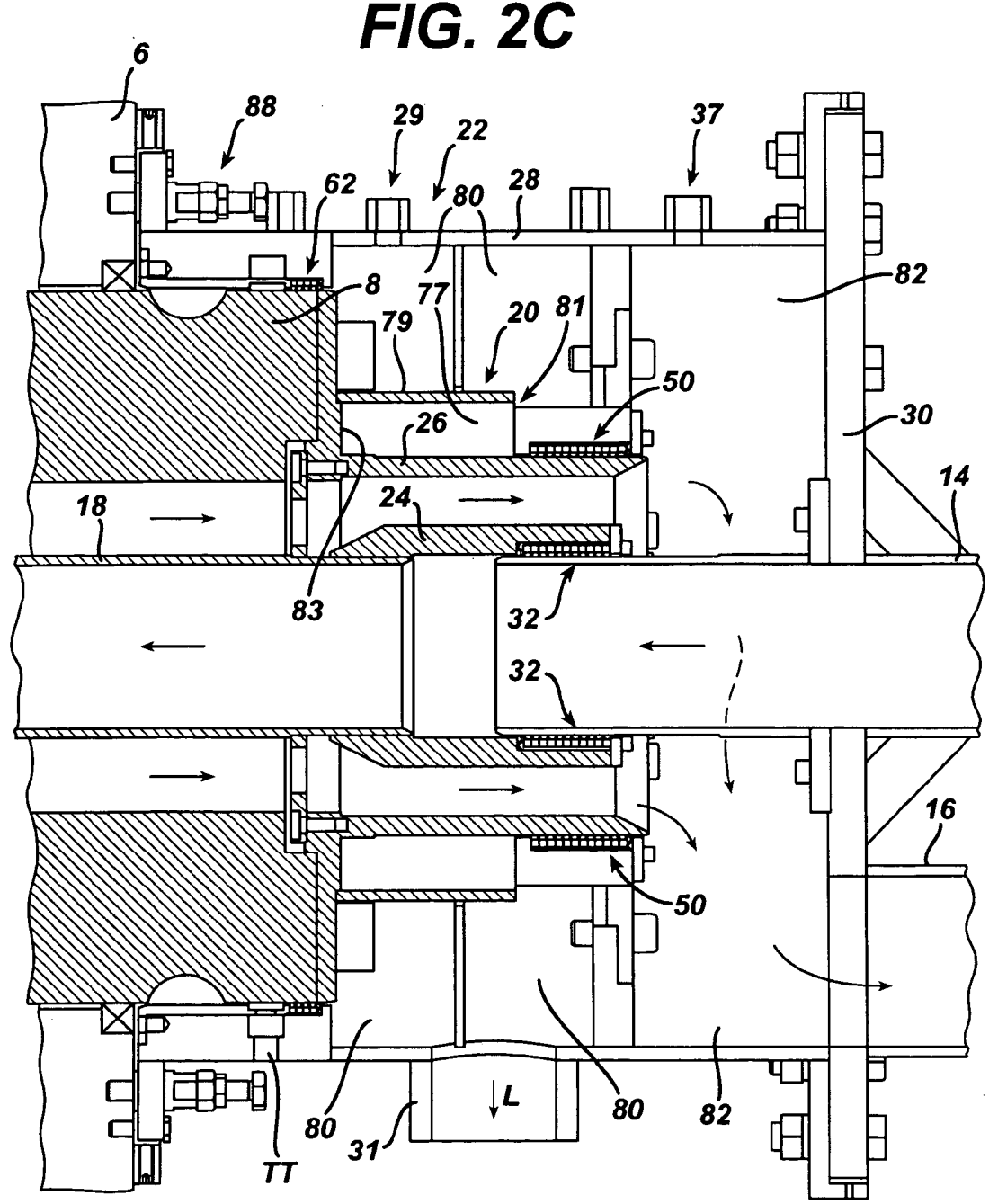
FIG. 2C is a view similar to FIG. 2A, with rotating parts indicated by cross-hatching.
Figure 3:
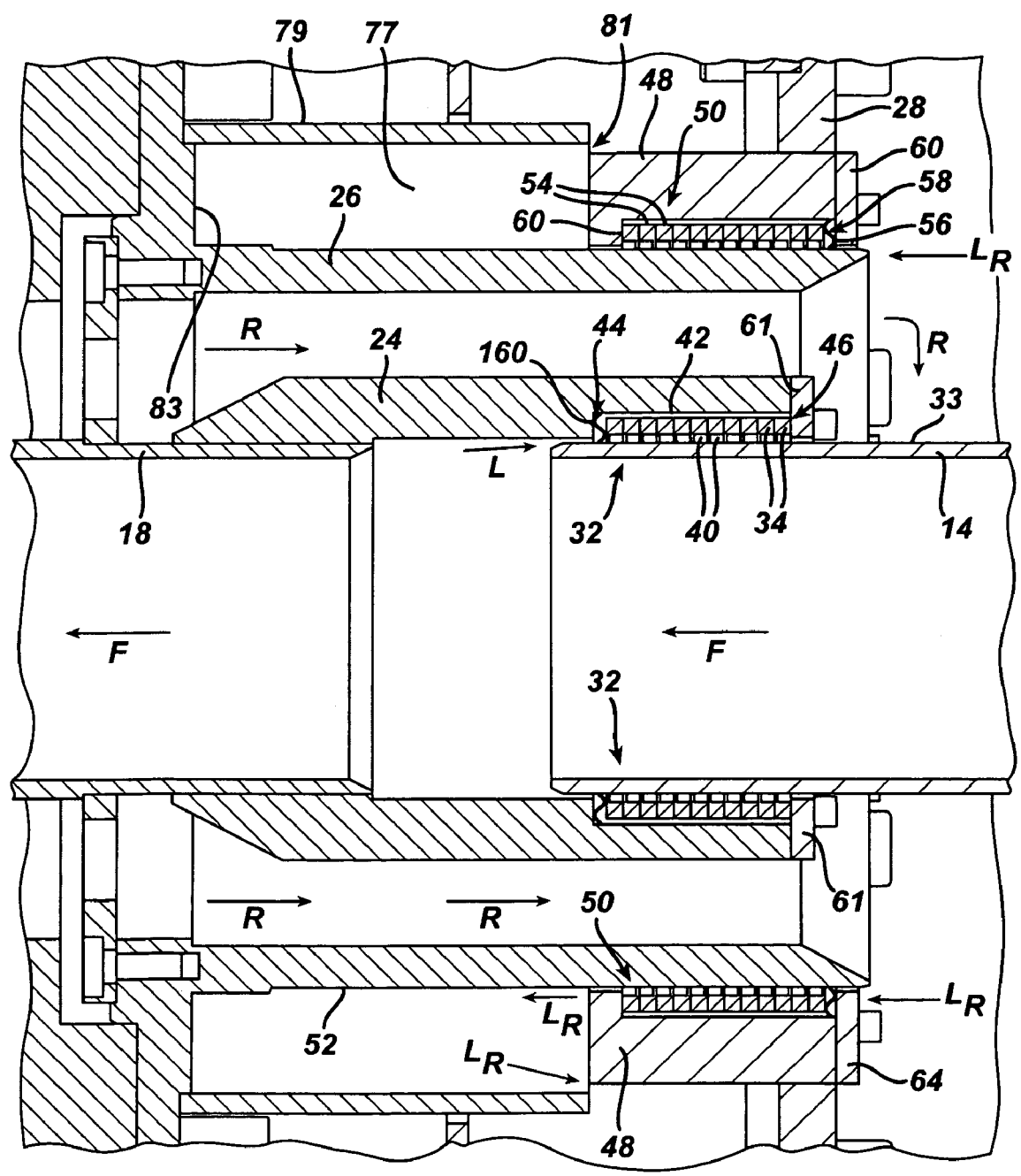
FIG. 3 is an enlarged detail view of a portion of FIG. 2A (as indicated by dotted lines in FIG. 2A), showing a floating seal configuration according to one embodiment of the invention.

The rotary joint 10 serves as an interface between the fluid supply, which is stationary, and the rotating calendar roll. In FIG. 2C, rotating parts are cross-hatched and stationary parts are not cross-hatched, to facilitate understanding of which parts are rotating and which are stationary. An inner portion 20 of the rotary joint rotates with the calendar roll, while an outer housing portion 22 of the rotary joint remains stationary. The inner portion 20 includes an internal supply pipe 18, and, joined to the internal supply pipe, a female ring retainer 24 and an outer seal mating cylinder 26. Referring to FIG. 3, female ring retainer 24 defines an inner seal cavity 42. The outer portion 22 includes an outer housing 28, an end cover 30 mounted on the outer housing, and inlet and outlet conduits 14, 16 extending through the end cover. The outer portion also defines a leak drain hole 31 and a normally closed vent hole 37 as well as a nitrogen inlet hole 29. Vent hole 37 is provided for maintenance purposes, to allow air into the roll when the system is being drained to minimize drain down time and vapor lock.

It is necessary to seal between the rotating inner portion of the joint and the stationary outer portion, to allow fluid to efficiently cycle in and out of the joint. Without seals, excessive amounts of fluid would be lost, and fluid pressure through the roll could not be properly maintained. However, we have found that it is not necessary to completely eliminate leakage. Instead, a controlled amount of leakage can be allowed, and the leaking fluid can be collected and, if desired, recycled with the fluid that exits through outlet conduit 16 by the use of a separate collection tank/pumping system.

Figure 8:
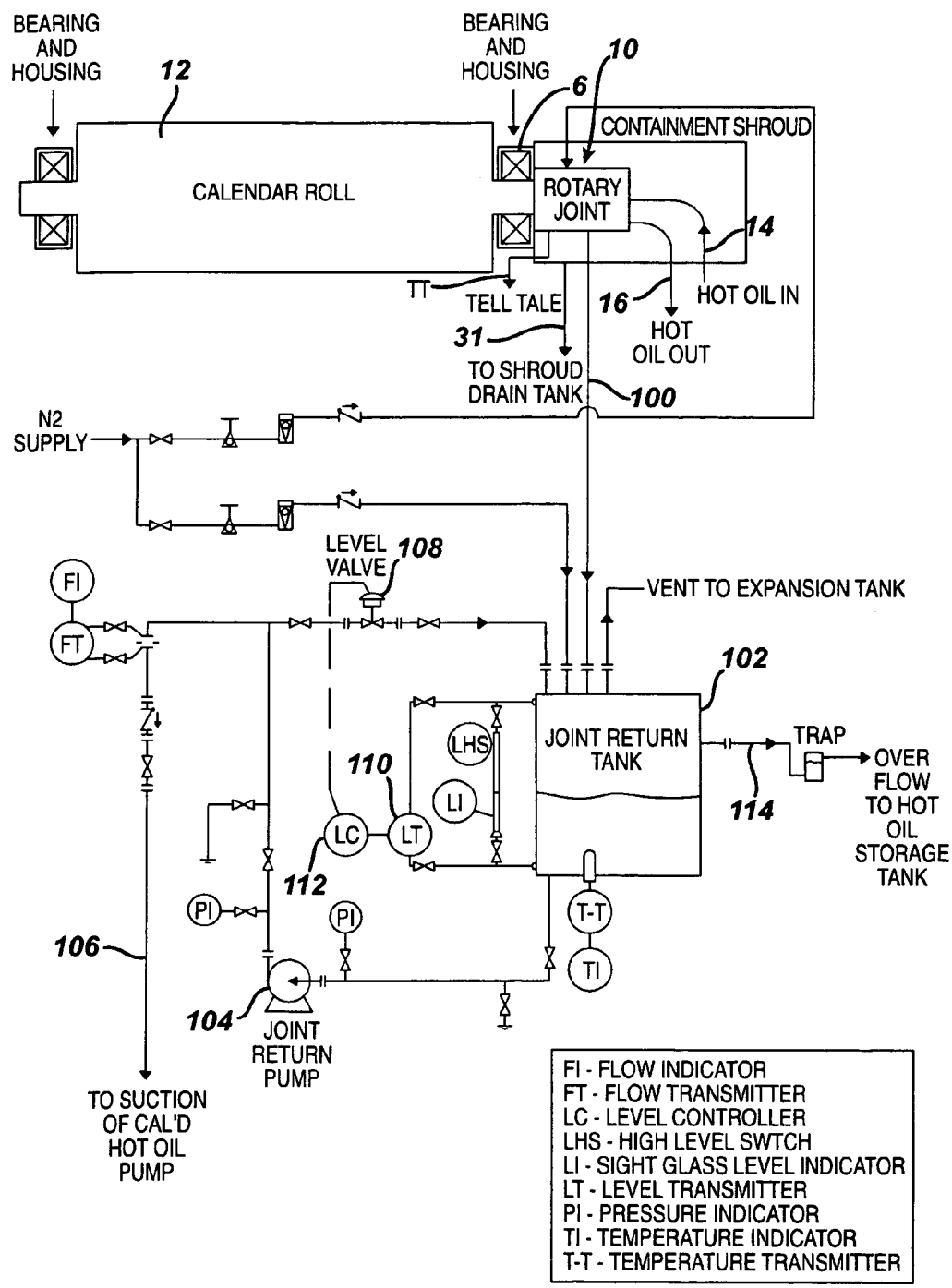
FIG. 8 is a schematic diagram showing a collection tank/pumping system for use with the rotary joint of FIG. 1.

An example of a suitable collection tank/pumping system is shown in FIG. 8. In the embodiment shown in FIGS. 1–3, leaking fluid passes out of drain hole 31 (arrow L in FIG.

2A). As shown in FIG. 8, the leaking fluid passes through conduit 100 and is collected in a joint return tank 102. A return pump 104 pumps the fluid from the joint return tank 102, through a conduit 106 and back to the inlet conduit 14 of the rotary joint via the suction of the calendar hot oil pump (not shown). As indicated in FIG. 8, a level valve 108 is provided to maintain a constant level of liquid in the tank, to prevent the return pump from drawing in air should the tank become empty. Level valve 108 is governed by a level transmitter 110 and a level controller 112. Should the level in the tank become too high, excess fluid will exit the joint return tank, via conduit 114 and flow into a hot oil storage tank (not shown).

An acceptable rate of leakage can be, for example, up to 5% of the total flow, typically from about 0.5–2% of the total flow. Preferably, the rate of leakage is sufficiently low so that the size and cost of the required collection tank and pumping system can be minimized. However, if desired, leakage may be adjusted to 10% of the total flow or more, simply by providing a pump large enough to accommodate return of the leaking fluid to the rotary joint. The total amount of acceptable leakage will vary depending on a number of factors, but in some applications may be, for example, from about 1 to 20 gallons/minute.

Because some leakage is acceptable, it is not necessary to use leak-proof seals between the rotating and stationary portions of the joint. Instead, floating seals can be used, allowing clearance and relative axial and radial movement between the portions. The clearance and radial motion accommodate movement of the bearing housing 6 (FIG. 2A) and manufacturing tolerances, while the relative axial movement accommodates thermal expansion and contraction of the parts as the calendar roll and rotary joint are heated by the hot fluid.

Thus, referring to FIG. 3, the female ring retainer 24 carries a floating high-pressure seal assembly 32 that seals between the outer seal surface 33 of the inlet conduit 14 and the inner surface of the female ring retainer 24, reducing leakage of fluid in the direction indicated by arrow L in FIG. 3. Thus, seal 32 reduces leakage of fluid that is flowing into the calendar roll (arrows F, FIG. 3). The high-pressure seal 32 is effective at relatively high fluid pressures, e.g., 60 psi and greater. A pressure of 60 psi is typically exerted at fluid flow rates of 400–600 gallons/minute in the direction of arrows F in FIG. 3. There is a large clearance area 42, e.g., about 0.05 to 0.06 inches wide, between the outer diameter of the rings and the inner surface of female ring retainer 24, allowing the rings to "float" and providing the clearance and axial/radial movement discussed above. If desired, the clearance area may be significantly wider, e.g., 0.125 inch or more.

Seal 32 includes a plurality of coaxially arranged rings 34 that have substantially the same inner and outer diameters. Rings 34 are shown in detail in FIGS. 5 and 5A and will be described below. Referring to FIG. 5A, each of the rings includes a relatively thick outer region 36 and a relatively thin inner region 38 defining a land 41. Referring again to FIG. 3, the rings are arranged so that the inner regions 38 (see FIG. 5A) act as dams, and the difference in thickness between regions 36 and 38 defines a plurality of spaces 40 (FIG. 3) between the rings that provide fluid turbulence zones. Because of clearance between land 41 and seal surface 33, a small amount of fluid can pass under the inner regions 38 and into spaces 40. Because the clearance is very small and the rings are closely spaced, there is a rapid pressure drop and turbulence as fluid attempts to pass through the seal.

Thus, the liquid being sealed must pass between the narrow lands 41 of the sealing rings and the seal surface 33. This clearance is very small (e.g., 0.003"–0.005"), minimizing the flow of the liquid. The liquid slows as it enters the open area 40 before it flows through the next land on the next ring. This creates microturbulence and a small pressure drop at each ring interface (i.e., the interface between land 41 and seal surface 33). When enough rings are stacked together the additive pressure drop of each ring results in a small amount of leakage through the seal assembly. Thus, more rings can be added to reduce leakage if desired. Generally, the number of rings is only limited by space constraints and cost. Similarly, if higher leakage can be tolerated, fewer rings can be used.

Figure 6:
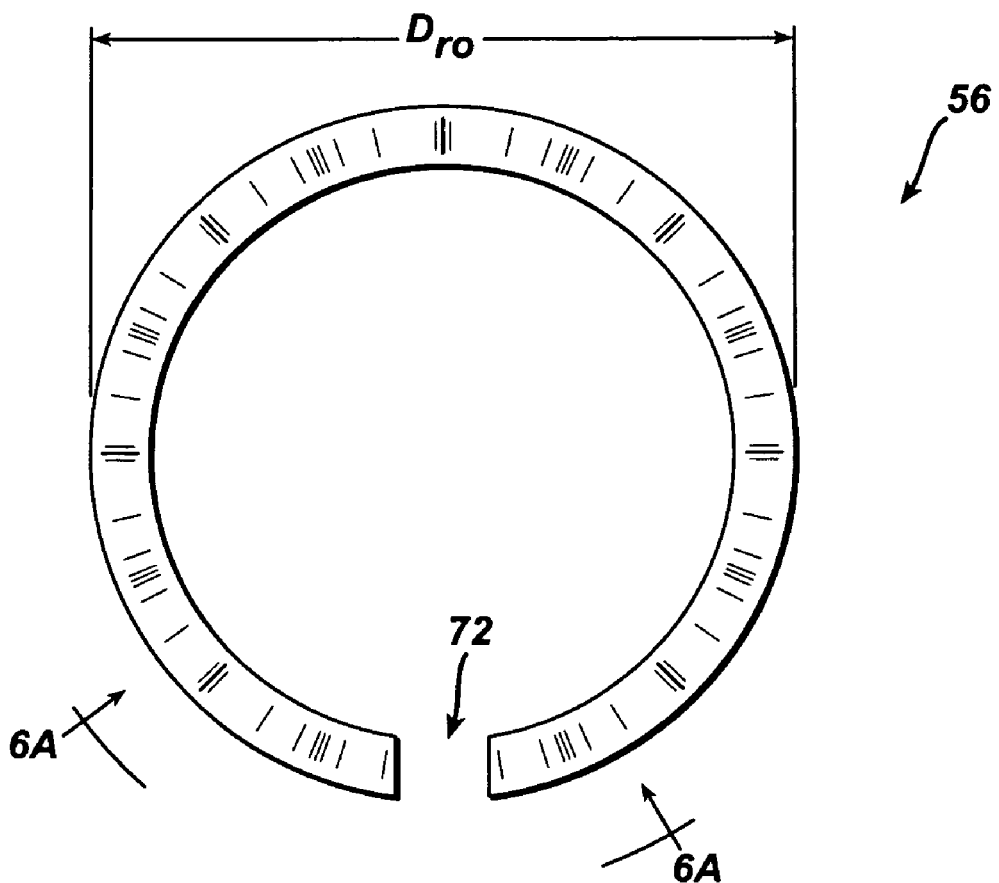
FIGS. 6 and 6A are, respectively, front and sectional views of a wave spring suitable for use in a floating seal.
Figure 6A:
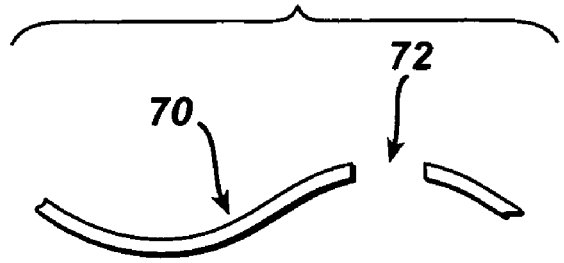

At the end 44 of the seal at which leaking liquid enters, a wave spring 160 is positioned to bias the rings 34 towards the opposite end 46 of the seal, pressing the rings together and resisting the pressure of the leaking fluid, which tends to force the rings apart. Because the wave spring exerts this biasing force, the wave spring further inhibits flow of leaking fluid between the rings 34 and also around the rings in region 42 because they are held against each other and against the seal retaining cover 61, effectively blocking that potential leakage path. A suitable wave spring is shown in FIGS. 6 and 6A and discussed below. Like the rings, the wave spring is positioned to "float" in the sealed area, with a clearance similar to that provided between the rings and inner flange.

Similarly, a seal-carrying portion 48 of the outer housing 28 carries a low-pressure seal 50 that seals between the outer surface 52, of the outer cylinder 26, and the seal-carrying portion 48 of the housing. Seal 50 reduces leakage of fluid in the direction indicated by arrow $L_R$ in FIG. 3, and thus reduces leakage of fluid that is returning from the calendar roll (arrows R, FIG. 3). Fluid that leaks past seal 50 leaks first into a chamber 77, from which it is directed by a rotating baffle 79 through opening 81 into a baffled and nitrogen purged chamber 80 (FIG. 2A). Rotating baffle 79 prevents most or all of the leaking fluid from contacting wall 83 (the face of the journal). The function of the nitrogen purge of chamber 80 will be discussed below. The low-pressure seal 50 is effective at moderate fluid pressures, e.g., about 10 to 15 psi. These pressures are typically exerted at fluid flow rates of 400 to 600 gallons/minute in the direction of arrows R in FIG. 3.

Like seal 32, seal 50 includes a wave spring that biases the rings toward the end that is opposite the end at which fluid enters the seal. Thus, the wave spring 56 is positioned at end 58, to bias the rings towards opposite end 60.

Referring to FIG. 2A, the liquid that leaks through seal 32 mixes with the main body of liquid exiting the rotary joint, as indicated by arrows R, while the liquid that leaks through seal 50 exits the rotary joint through leak drain hole 31, as indicated by arrow L.

Because the floating seals are comprised of floating rings and a floating ring-shaped wave spring, the rotary joint can be easily assembled by positioning the rings and spring in the area to be sealed and then bolting a cover in place. For example, referring to FIG. 3, cover 61 is provided for seal 32 and a cover 64 is provided for seal 50. The seals can be maintained and replaced, as needed, simply by removing the cover and any rings that require repair or replacement.

As noted above, referring to FIGS. 2A and 2B, fluid that leaks past seal 50 leaks into a baffled and nitrogen purged chamber 80 of the housing. Unlike adjacent chamber 82, chamber 80 is not flooded with fluid when the rotary joint is in use (see FIG. 2B, in which areas containing fluid are shaded). As a result, if chamber 80 is not purged with nitrogen there is air present in the chamber. This air will tend to oxidize any leaking oil that enters chamber 80, potentially causing coking and posing a fire risk if an ignition source is present. Thus, as discussed above it is desirable that chamber 80 be purged with nitrogen during use of the rotary joint to prevent oxidation.

Figure 4:
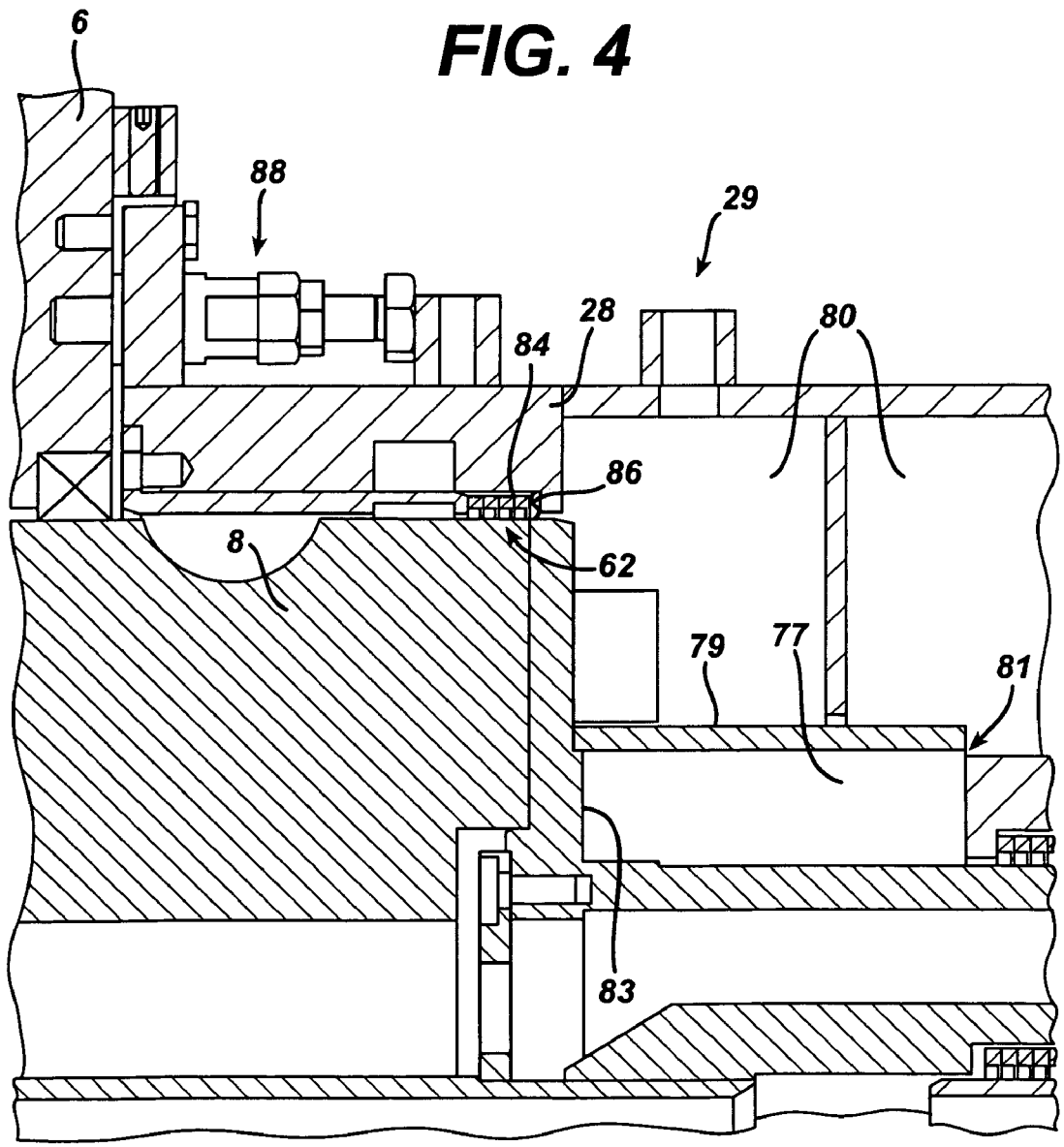
FIG. 4 is an enlarged detail view of another portion of FIG. 2A (as indicated by dotted lines in FIG. 2A), showing a nitrogen-conserving floating seal.

Referring to FIG. 2A and FIG. 4, the rotary joint 10 further includes a nitrogen-conserving seal 62 that seals between the outer housing 28 and the calendar roll journal 8. This seal inhibits leakage of nitrogen from chamber 80, thus minimizing the cost of providing the nitrogen purge. Seal 62 is similar in structure to the seals discussed above, except that it includes fewer rings 84, because seal 62 only has to seal at low pressures of about 0.5" water (the pressure of the nitrogen in chamber 80). Like the seals discussed above, the rings are biased by a wave spring 86 in the direction of fluid flow into the seal.

Referring to FIG. 2A, as a safety feature, a "tell-tale" opening TT is provided adjacent the seal 62 at the bottom of the rotary joint. If the chamber 80 were to become flooded with fluid, e.g., in the event of a seal failure, liquid would flow out of the tell-tale. A sensor can be positioned to detect and signal the presence of liquid flowing from the tell-tale, e.g., by sounding an alarm or providing an indication on a control panel. Alternatively, visual detection can be used to determine if liquid is flowing from the tell-tale.

A ring suitable for use in the high-pressure floating seal described above is shown in FIGS. 5 and 5A. As discussed above, ring 34 includes a relatively thick outer region 36 and a relatively thin inner region 38. Referring to FIG. 5A, typically the outer region 36 has a thickness $T_1$ of from about 0.125 to 0.250 inch and a width $W_1$ of from about 0.125 to 0.250 inch, and the inner region 38 has a thickness $T_2$ of from about 10–20% of $T_1$, and a width $W_2$ of from about 4 to 10 times $T_2$. Generally, the ratio of $T_1$ to $T_2$ is from about 1:10 to 1:5, and the ratio of $W_1$ to $W_2$ is from about 1:1 to 2:1. The smaller the thickness $T_2$, the greater the leakage control but also the greater the tendency for land 41 to wear relatively quickly. For a rotary joint to be used with a calendar roll having a diameter of 52 inches, typically the inner diameter ID of ring 34 is from about 4.0 to 5.0 inches, and the outer diameter OD is from about 4.5 to 5.5 inches.

Rings suitable for use in the low-pressure floating seal and nitrogen-conserving seal are similar to the ring shown in FIGS. 5 and 5A. The low-pressure seal rings 54 and nitrogen seal rings 84 typically have similar dimensions for $T_1$, $W_1$, $T_2$, and $W_2$. For a rotary joint to be used with a calendar roll having a diameter of 52 inches, typically the inner diameter ID of the low-pressure seal rings is from about 9 to 10 inches, and the outer diameter OD is from about 9.5 to 10.5 inches, while the inner diameter ID of the nitrogen seal rings is from about 17 to 18 inches, and the outer diameter OD is from about 17.5 to 18.5 inches.

Because there is relative motion between the lands 41 of the sealing rings and the opposed sealing surfaces 33 and 52 of the high and low pressure seals, the lands will tend to wear during use, which will eventually increase leakage through the seals. If desired, the seal surfaces 33 and 52 may be electroplated with nickel to increase the metal lubricity and thereby reduce the wear rate of this critical clearance area.

A suitable wave spring for use in biasing the rings is shown in FIGS. 6 and 6A. Wave spring 56 includes waves 70 (FIG. 6A), and a free gap 72, as is well known in the art. When wave spring 56 is compressed, waves 70 are flattened and free gap 72 is reduced or closed. In its compressed position, wave spring 56 exerts a biasing force that is determined by the material of the spring and the free height and work height of the waves (FIG. 6A). The properties of the wave springs used in the high pressure, low pressure and nitrogen-conserving seals are generally similar, but can differ if desired. The free inside diameter and free outside diameter of the wave spring are generally substantially the same as the OD and ID of the rings used in the seal. The force exerted by the wave spring may be adjusted by using more than one wave spring (stacking them coaxially), and/or by selecting a wave spring with desired properties. If too little pressure is exerted by the wave spring(s), the rings may tend to move axially which may result in increased leakage through the seal. If too much pressure is exerted by the wave spring(s), the lands of the rings may wear at an undesirably high rate.

Preferably, the entire rotary joint is formed of the same material, to minimize differences in thermal expansion between the parts of the joint and minimize changes in clearance between the parts during thermal cycling. Generally, it is preferred that the rotary joint be formed of steel for durability, strength and ease of manufacture.

It is also preferred that the rotary joint include a centering jack 88, as shown in FIG. 4, for aligning the housing of the rotary joint to the journal when a self-aligning spherical roller-bearing is used to support the rotation of the calendar roll.

Other embodiments are within the scope of the following claims.

Figure 7:
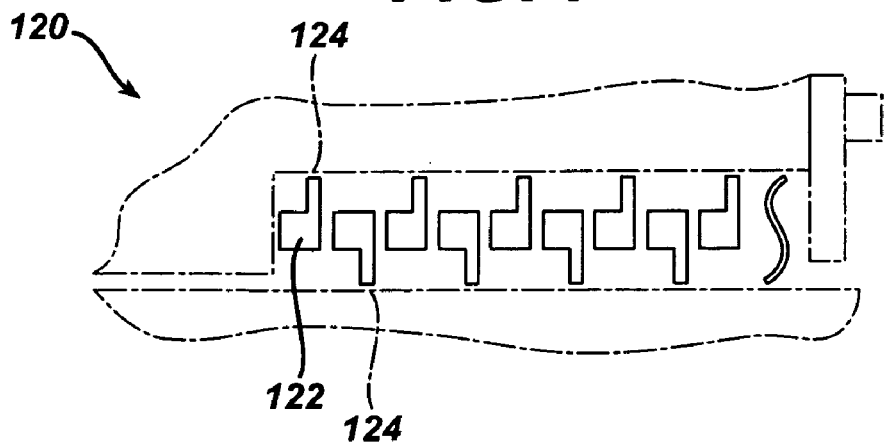
FIGS. 7–7E are highly enlarged diagrammatic views showing floating seals according to alternate embodiments of the invention.
Figure 7A:
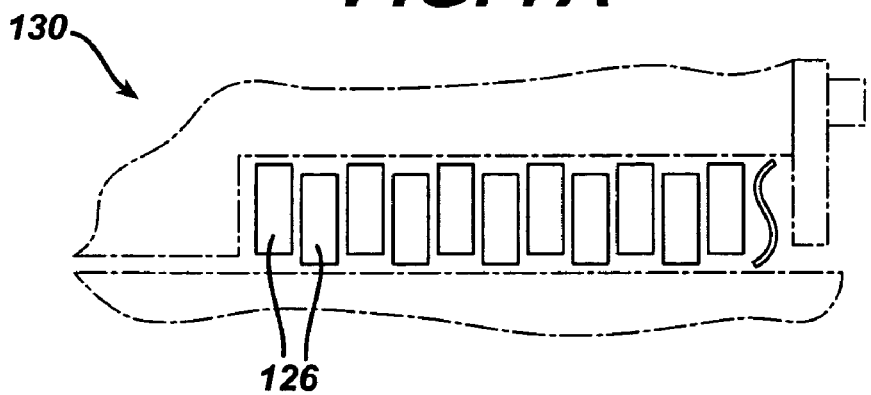
Figure 7B:
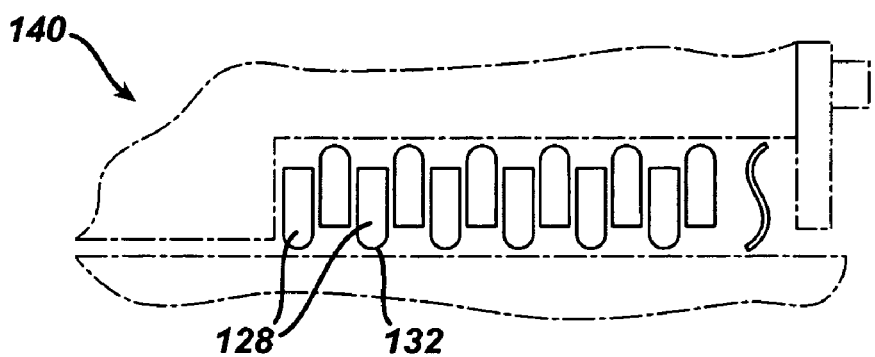
Figure 7C:
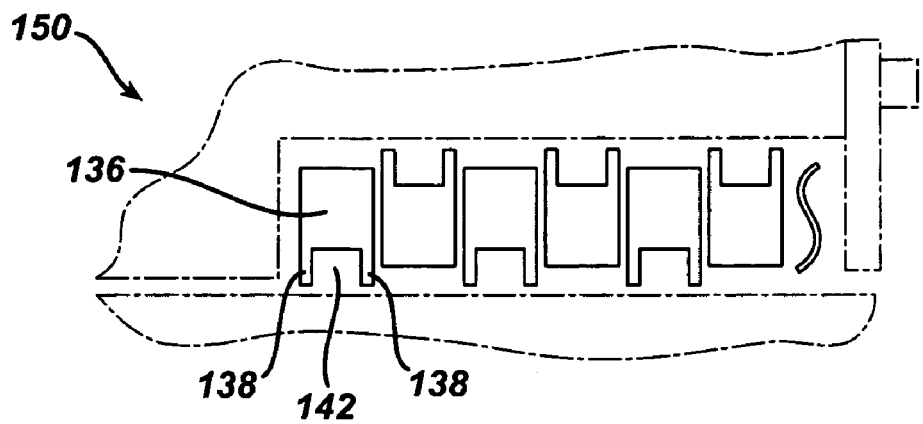
Figure 7D:
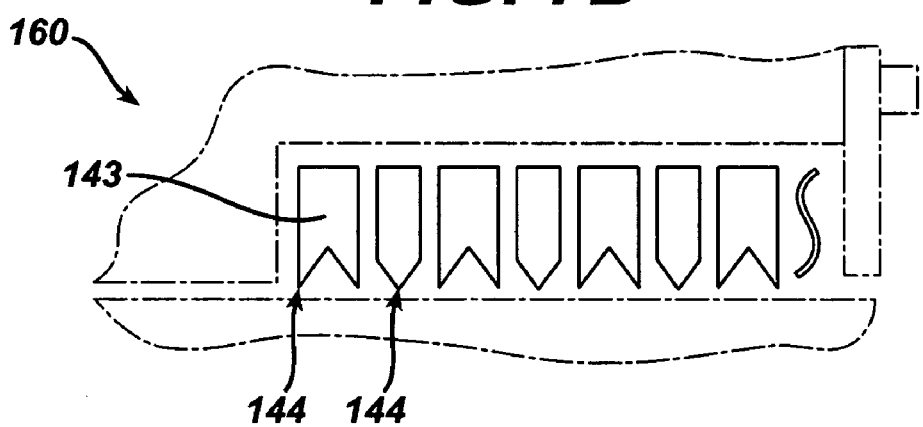
Figure 7E:
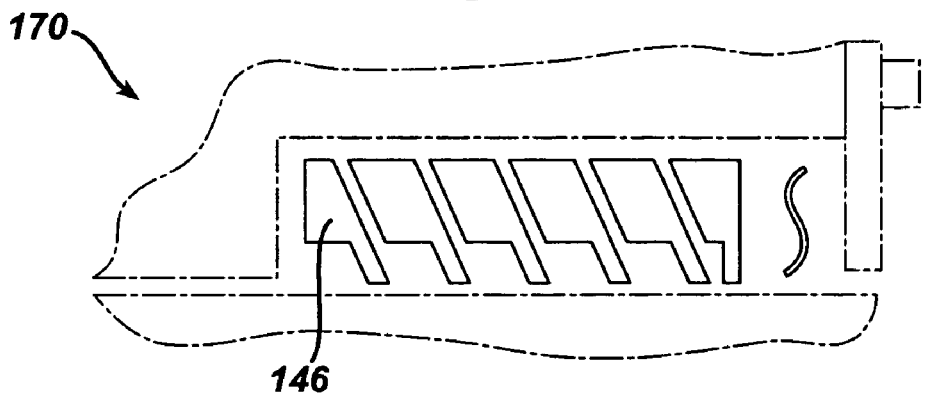

The floating seal may have many other ring configurations. For example, as shown in FIG. 7, in a seal 120 rings 122 are arranged so that their lands 124 face in alternating, opposite directions, to provide a tortuous path through which the leaking fluid can flow. Other alternative configurations are shown in FIGS. 7A–7E. As shown in FIG. 7A, a seal 130 may include rings 126 that are substantially rectangular in cross-section, without a narrow region 38. As shown in FIG. 7B, in seal 140 similar rings 128 include lands 132 that are radiused to reduce wear. As shown in FIG. 7C, a seal 150 may include rings 136 having a pair of opposed relatively thin regions 138, defining a chamber 142. As shown in FIG. 7D, a seal 160 may include rings 143 with pointed sealing edges 144. The pointed sealing edges may result in a progressively reduced wear rate for rings 143, due to increased land area as the pointed edges wear down. As shown in FIG. 7E, a seal 170 may include rings 146 that are biased on an angle to increase shear of the fluid leaking under the sealing lands. This configuration may be beneficial when the fluid to be sealed is relatively viscous, e.g., adhesives or resins.

The rotary joint is also self-venting. As is well known in the art, upon system start-ups it is necessary to vent a large volume of air (e.g., a 300 gallon volume or more) that has been introduced into the roll or oil system as a result of draining all the oil out during a shut-down. The floating seals of the rotary joint described above allow the air to vacate the liquid loop very quickly through the seal rings. This self-venting feature minimizes pump cavatation when first starting the system up from a maintenance outage, reducing down-time and labor costs. For example, a volume of about 300 gallons can typically vent through the rotary joint described above in less than about 3 minutes.

Moreover, while the rotary joint discussed above is suitable for delivering hot oil to a calendar roll, the rotary joint can be used in other applications, to join any desired rotating and stationary members. For example, the rotary joint can be used in applications that involve continuous heating or curing of a sheet material, e.g., with laminating rolls used in the textile industry and with other types of nip rolls. The liquid delivered can be cold, to chill the rotating member, and may be any desired liquid. If the liquid is corrosive, the rotary joint may be formed of stainless steel, titanium, or other inert material.

Moreover, instead of wave springs, any other desired type of biasing device may be used, including coil springs and leaf springs.

What is claimed is:

1. A rotary joint configured to couple a rotating member comprising a calendar roll to a relatively stationary member, the rotary joint comprising
    a housing, configured to fit over the rotating member and receive a fluid to be delivered from the stationary member through the rotating member, the housing defining an inlet and an outlet through which the fluid can flow into and out of the rotating member, respectively;
    a rotatable coupling disposed within the housing, configured to be fixedly attached to the rotating member; and
    a floating seal system configured to allow a controlled amount of fluid to leak from the rotary joint during delivery of a fluid from the stationary member through the rotating member;
    wherein the rotary joint does not include bearings.

2. The rotary joint of claim 1 wherein the controlled amount is from about 0.5 to 2.0% of the total flow of fluid into the rotary joint.

3. The rotary joint of claim 2 wherein the controlled amount is from about 1 to 20 gallons/minute.

4. The rotary joint of claim 1 wherein the floating seal system comprises a plurality of floating labyrinth seals.

5. The rotary joint of claim 4 wherein said floating labyrinth seals are disposed between the rotatable coupling and portions of the housing.

6. The rotary joint of claim 1 farther comprising a nitrogen-purged chamber configured to capture the fluid leaking from the rotary joint and allow this fluid to be collected for return to the rotary joint.

7. The rotary joint of claim 1 wherein the rotary joint does not include mechanical seals.

8. The rotary joint of claim 1 wherein the housing and rotatable coupling are formed of the same material.

9. The rotary joint of claim 8 wherein the material is steel.

10. The rotary joint of claim 1 wherein the floating seal system is configured to allow air to self-vent through the rotary joint upon staff-up after a maintenance outage.

11. The rotary joint of claim 10 wherein the floating seal system is configured to allow air to vent through the rotary joint at a rate of at least 25 gallons/minute.

12. The rotary joint of claim 11 wherein the floating seal system is configured to allow air to vent through the rotary joint at a rate of at least 100 gallons/minute.

13. The rotary joint of claim 1 wherein the rotating member comprises a calendar roll.

14. A method of delivering fluid from a stationary source to a rotating member comprising a calendar roll, the method comprising
    delivering a fluid from the source to a rotary joint that does not include bearings, the rotary joint comprising a housing, configured to fit over the rotating member and having a portion configured to receive the fluid and deliver the fluid to the rotating member, and the housing defining an inlet and an outlet through which the fluid can flow to and from the rotating member;
    passing fluid through a rotatable coupling, disposed within the housing and configured to be fixedly attached to the rotating member; and
    allowing a controlled amount of fluid to leak past a floating seal system disposed between the rotatable coupling and the housing.

15. The method of claim 14 wherein the controlled amount is from about 0.5 to 2.0% of the total flow of liquid into the rotary joint.

16. The method of claim 15 wherein the controlled amount is from about 1 to 20 gallons/minute.

17. The method of claim 14 wherein the floating seal system comprises a plurality of floating labyrinth seals.

18. The method of claim 14 further comprising collecting the leaked fluid and returning it to the source for delivery into the rotary joint.

19. The method of claim 14 wherein the liquid is hot oil.

20. The method of claim 19 wherein the liquid is mineral oil.

21. The method of claim 19 further comprising purging air-containing areas of the housing with an inert gas to inhibit oxidation of the oil.

22. The method of claim 14 wherein the liquid has a viscosity lower than that of water when the liquid is being circulated near its fluid maximum bulk operating temperature.

23. The method of claim 14 further comprising purging air-containing areas of the housing.

* * * * *

UNITED STATES PATENT AND TRADEMARK OFFICE
CERTIFICATE OF CORRECTION

| | | |
|---|---|---|
| PATENT NO. | : 7,150,477 B2 | Page 1 of 1 |
| APPLICATION NO. | : 10/125982 | |
| DATED | : December 19, 2006 | |
| INVENTOR(S) | : Mark A. Reifschneider and Richard A. Lippert | |

It is certified that error appears in the above-identified patent and that said Letters Patent is hereby corrected as shown below:

Column 9, line 37 should read:

6. The rotary joint of claim 1 ~~farther~~ <u>further</u> comprising a

Signed and Sealed this

Fifteenth Day of April, 2008

JON W. DUDAS
*Director of the United States Patent and Trademark Office*